United States Patent [19]

Morrow et al.

[11] Patent Number: 5,043,997
[45] Date of Patent: Aug. 27, 1991

[54] HYBRID CATHODE

[75] Inventors: Clifford E. Morrow, Wayland; Richard S. Eng, Newton, both of Mass.

[73] Assignee: Raytheon Company, Lexington, Mass.

[21] Appl. No.: 730,123

[22] Filed: May 3, 1985

[51] Int. Cl.[5] .......................................... H01S 3/097
[52] U.S. Cl. ...................................... 372/87; 372/59; 372/34; 372/61
[58] Field of Search ..................... 372/87, 88, 98, 58, 372/55, 61, 34, 81, 83

[56] References Cited

U.S. PATENT DOCUMENTS

| | | |
|---|---|---|
| 2,870,364 | 1/1959 | Doolittle et al. . |
| 3,361,922 | 1/1968 | McCurdy et al. . |
| 3,609,582 | 9/1971 | Smets et al. ............................. 372/88 |
| 3,666,982 | 5/1972 | Wiegand .............................. 313/632 |
| 3,688,217 | 8/1972 | Witte et al. ............................ 372/87 |
| 3,784,928 | 1/1974 | Crane .................................... 372/88 |
| 3,899,751 | 8/1975 | Hochuli ......................... 331/94.5 T |
| 3,991,385 | 11/1976 | Fein et al. ............................. 372/87 |
| 4,287,483 | 9/1981 | Rudko et al. .......................... 372/86 |
| 4,411,733 | 10/1983 | Macklin et al. ........................ 372/62 |
| 4,504,955 | 3/1985 | Macklin et al. ........................ 378/81 |
| 4,547,886 | 10/1985 | Kaminski et al. ...................... 372/59 |
| 4,617,668 | 10/1986 | Rudko et al. .......................... 372/87 |
| 4,633,129 | 12/1986 | Cuomo et al. . |

FOREIGN PATENT DOCUMENTS

| | | |
|---|---|---|
| 0078540 | 5/1983 | European Pat. Off. .............. 372/33 |
| 818505 | 8/1959 | United Kingdom . |
| 977545 | 12/1964 | United Kingdom . |
| 1256398 | 12/1971 | United Kingdom ................. 372/59 |
| 1353658 | 5/1974 | United Kingdom . |
| 1540619 | 2/1979 | United Kingdom . |
| 2031643A | 4/1980 | United Kingdom . |
| 2107109A | 4/1983 | United Kingdom . |
| 2107109 | 4/1983 | United Kingdom ................. 372/59 |
| 2123206A | 1/1984 | United Kingdom . |

OTHER PUBLICATIONS

"Long-Term Operation of a Sealed Waveguide $CO_2$ Laser", by P. Pace et al., *Rev. Sci. Instrum.*, vol. 52, No. 10, Oct. 1981, pp. 1493-1496.
"Investigation of Cold Cathode and RF Excitation for Long Life $CO_2$ Waveguide Lasers", by U. Hochuli, *Annual Summary Report for Contract N00014-79-C-312, P2*, Electrical Engineering Department, University of Maryland, Dec. 82.
"Cold Cathodes for Sealed-Off $CO_2$ Lasers", by U. Hochuli et al., *NASA Technical Note TN D-7307*, Aug. 1973.
"$CO_2$ Laser Cold Cathode Research Results", by U. Hochuli, *Final Report for NASA Grant NGR 21-00-2-345*, Department of Electrical Engineering, University of Maryland, Dec. 1973.

*Primary Examiner*—Léon Scott, Jr.
*Attorney, Agent, or Firm*—Christopher L. Maginniss; Richard M. Sharkansky

[57] ABSTRACT

A laser is provided comprising a laser envelope and a gain medium disposed in the laser envelope. The gain medium comprises a compound subject to dissociation into a plurality of components. Circuitry is included for generating an electrical discharge in the laser envelope, a portion of the electrical discharge passing through the gain medium and disassociating a portion of the compound thereof into the plurality of components. The discharge generating circuitry comprises a cathode, the cathode comprising a first portion for emitting the electrical discharge toward an anode. Such first portion comprises a catalyst for aiding the recombination of the dissociated plurality of components. The first portion of the cathode sputters particulates therefrom during the electrical discharge and a surface is disposed within the laser envelope for collecting the sputtered particulates. Means, including a second portion of said cathode, are additionally provided for spacing the first portion of the cathode sufficiently from the collecting surface to substantially prevent the electrical discharge from being emitted from the first portion to the collected particulate, and thereby constrain the electrical discharge to occur substantially directly between the cathode and the anode. With such arrangement, the sputtered particulates are inhibited from entering the resonant cavity of the laser and adhering to the optics thereof. Thus, the useful operating life of the laser is increased.

17 Claims, 2 Drawing Sheets

HYBRID CATHODE

BACKGROUND OF THE INVENTION

This invention relates generally to the field of lasers and more particularly to electrodes for use in $CO_2$ waveguide lasers.

As is known, $CO_2$ waveguide lasers have a wide variety of applications. For example, such lasers find use in Doppler velocimeters and navigation systems Thus, it is desirable that $CO_2$ waveguide lasers have an operating life which is as long as possible. A conventional $CO_2$ waveguide laser comprises an optical resonator disposed in an envelope filled with a low-pressure, gaseous active gain medium. The gain medium is typically a mixture of carbon dioxide ($CO_2$), carbon monoxide (CO), helium (He) and xenon (Xe). One or more anode electrodes, typically made from platinum or nickel, are positioned within the envelope Also disposed within the envelope are one or more cathode electrodes, typically made from substantially pure copper. When an electrical potential is applied between the anode and cathode electrodes, an electrical discharge is produced therebetween in the gain medium which induces lasing. The active portion of the gaseous gain medium, that is, the portion of the gain medium in which energy level transitions occur in response to the electrical discharge, is $CO_2$. The electrical discharge also dissociates a portion of the active $CO_2$ gas into components thereof, most notably carbon monoxide (CO) and oxygen ($O_2$). Such dissociation reduces the volume of the active $CO_2$ gas in the laser, causing a degradation of laser output power and eventual laser failure. Thus, $CO_2$ dissociation reduces the operating life of the laser.

One solution to the problem of $CO_2$ dissociation is to periodically introduce a fresh $CO_2$-CO-He-Xe gas mixture into the envelope. This is not a practical solution, however, where the application of the laser requires the device to be sealed.

Where the laser is sealed, that is, where the resonator is disposed in a vacuum envelope, the dissociated components (CO and $O_2$) of the $CO_2$ must be recombined in order to prolong laser operating life. Carbon monoxide and oxygen do not recombine at room temperature; however, CO and $O_2$ will recombine under certain conditions when such recombination is aided by certain catalysts. One catalyst which has been used is Hopcalite, a commercially available mixture of magnesium oxide ($MnO_2$) and cupric oxide (CuO). However, Hopcalite adsorbs a rather large quantity of the gaseous gain medium, and the catalytic activity level of Hopcalite may be difficult to control. Further, free oxygen not recombined with CO by the catalyst oxidizes the copper cathode electrode, thereby forming a relatively thick, and thus fragile, copper oxide layer Portions of such thick coppper oxide layer can flake off and form particles that can disperse throughout the resonant cavity and onto the surfaces of the laser optics, for example, the resonant cavity mirrors. This degrades the output power of the device and limits the useful operating life of the laser.

Another technique which has been used to aid the recombination of CO and $O_2$ in sealed $CO_2$ waveguide lasers is to construct the cathode from either substantially pure platinum or an alloy of platinum and rhodium. As is known, platinum is an effective recombination catalyst for CO and $O_2$. However, a platinum or platinum alloy cathode sputters platinum particulates which are deposited on regions of the envelope adjacent to the cathode during discharge. Such sputtering is a result of bombardment of the cathode by positive ions during the electrical discharge, causing the emission of electrons from the platinum cathode toward the anode. As a result of the deposition of sputtered platinum adjacent to the cathode, the electrical discharge may at times effectively occur from a random one or ones of the platinum deposits, rather than from the surface of the cathode itself. To put it another way, the electrical discharge may randomly jump from the surface of the cathode to a platinum particulate sputter deposit and occur between the platinum deposit and the anode, rather than directly between the cathode and anode. Over time, as additional sputtered platinum particulates are deposited near the cathode, the electrical discharge is given a progressively larger surface over which to occur. Thus, the electrical discharge may effectively migrate randomly about in the area of the cathode from one sputter deposit location to another during electrical discharge. Additionally, the sputtered particulates may become deposited onto the laser optics, damaging the optics and reducing the useful operating life of the laser.

SUMMARY OF THE INVENTION

In accordance with the present invention, apparatus is provided for generating an electrical discharge between a cathode and an anode, a portion of the electrical discharge passing through a gain medium. The gain medium comprises a compound subject to dissociation into two components by the electrical discharge. The cathode comprises catalyst means, emitted by the cathode, for aiding recombination of the dissociated components. The apparatus further comprises means for collecting the emitted catalyst means on a surface spaced from the cathode constraining the discharge to occur substantially directly between the cathode and the anode. With such arrangement, the dissociated components of the gain medium compound are recombined, and the electrical discharge is restricted to occur substantially directly between the cathode and the anode, rather than jumping between the cathode and the emitted and collected catalyst means.

The invention further provides an electrode comprising means for aiding recombination of components of a gain medium dissociated by an electrical discharge produced at the electrode. The electrode further comprises means for facilitating production of the electrical discharge substantially at the recombination aiding means.

In a preferred embodiment of the invention, apparatus is provided comprising an optical resonant cavity having a gain medium disposed therein. The gain medium comprises a compound, such as carbon dioxide ($CO_2$), subject to dissociation into components thereof, such as carbon monoxide (CO) and oxygen ($O_2$). Means are further included for generating an electrical discharge in the gain medium, the electrical discharge dissociating a portion of the compound into the components thereof. The electrical discharge producing means comprises a plurality of electrodes, a first one of the plurality of electrodes comprising a first portion comprising means for recombining the dissociated components. Means are further included for restricting the discharge to occur substantially directly between the first one of the plurality of electrodes and a second one of the plurality of electrodes.

More specifically, a laser is provided comprising a laser envelope and a gain medium disposed in the laser envelope, the gain medium comprising a compound subject to dissociation into a plurality of components thereof. Means are further provided for generating an electrical discharge in the laser envelope, a portion of the electrical discharge passing through the gain medium and dissociating a portion of the compound thereof into the plurality of components. The discharge generating means comprises a cathode, the cathode comprising a first portion for emitting the electrical discharge toward the anode, the first portion comprising a catalyst for aiding the recombination of the dissociated plurality of components. The first portion sputters particulates therefrom during the electrical discharge, and a surface is disposed within the laser envelope for collecting the particulates. Also provided are means, including a second portion of the cathode, for spacing the first portion of the cathode from the collecting surface substantially preventing the electrical discharge from being emitted from the first portion to the particulates. With such arrangement, the sputtered particulates are inhibited from entering the optical resonant cavity of the laser and adhering to the optics thereof. Thus, the useful operating life of the laser is increased.

The invention further includes a method of operating a laser comprising the steps of: generating an electrical discharge between a cathode and an anode through a gain medium, the electrical discharge dissociating a compound of the gain medium into components thereof; recombining the dissociated components of the gain medium; sputtering particulates from the cathode; and collecting the sputtered particulates on a surface sufficiently spaced from the cathode to constrain the electrical discharge to occur substantially directly between the cathode and the anode.

BRIEF DESCRIPTION OF THE DRAWINGS

The foregoing objects and other features of the present invention may be understood from the following detailed description together with the accompanying drawings wherein.

DESCRIPTION OF THE PREFERRED EMBODIMENT

Figure 1:
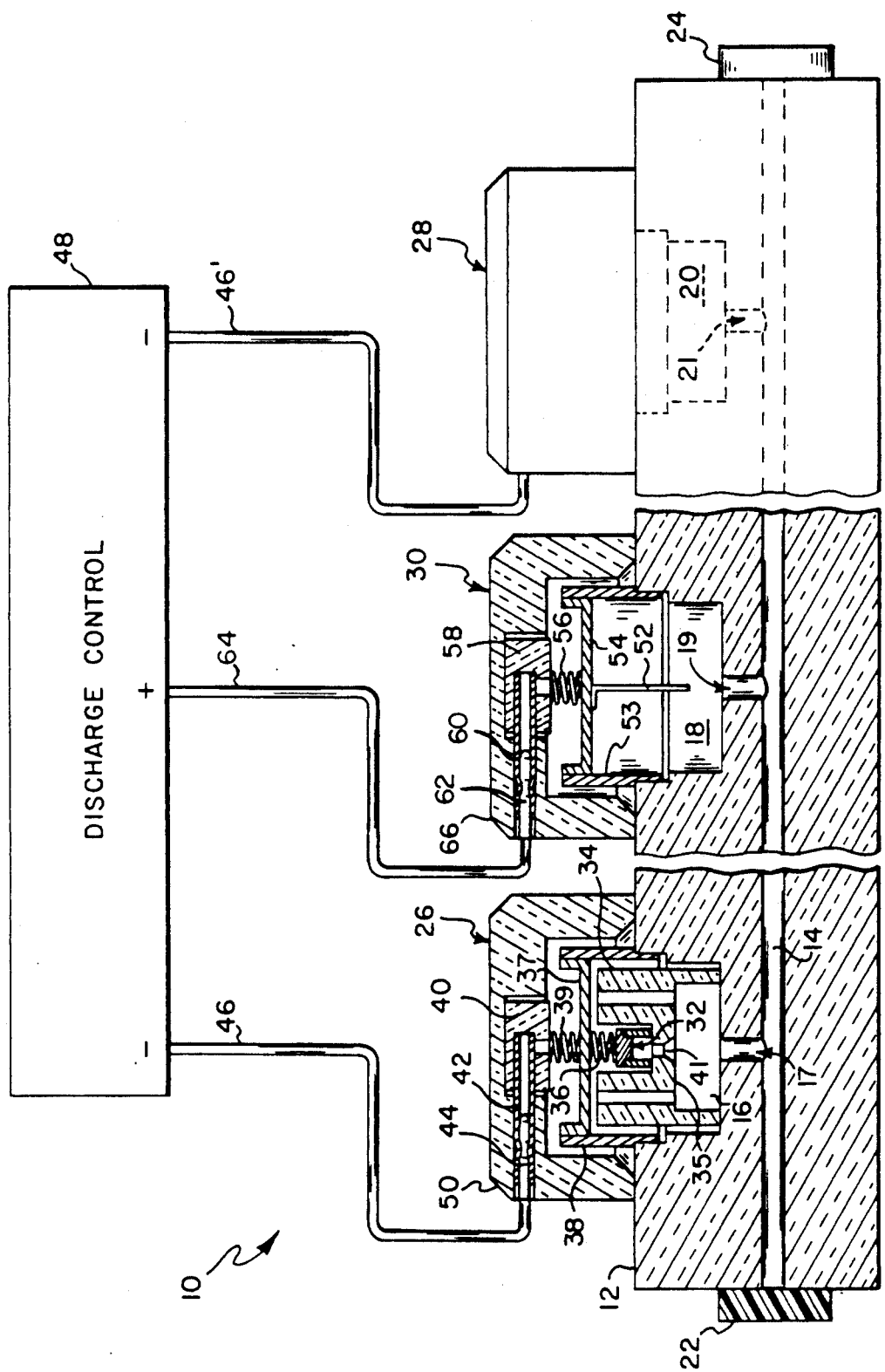
FIG. 1 is a partial cross-sectional view of a waveguide $CO_2$ laser embodying a cathode assembly comprising the hybrid cathode of the present invention.
Figure 2:
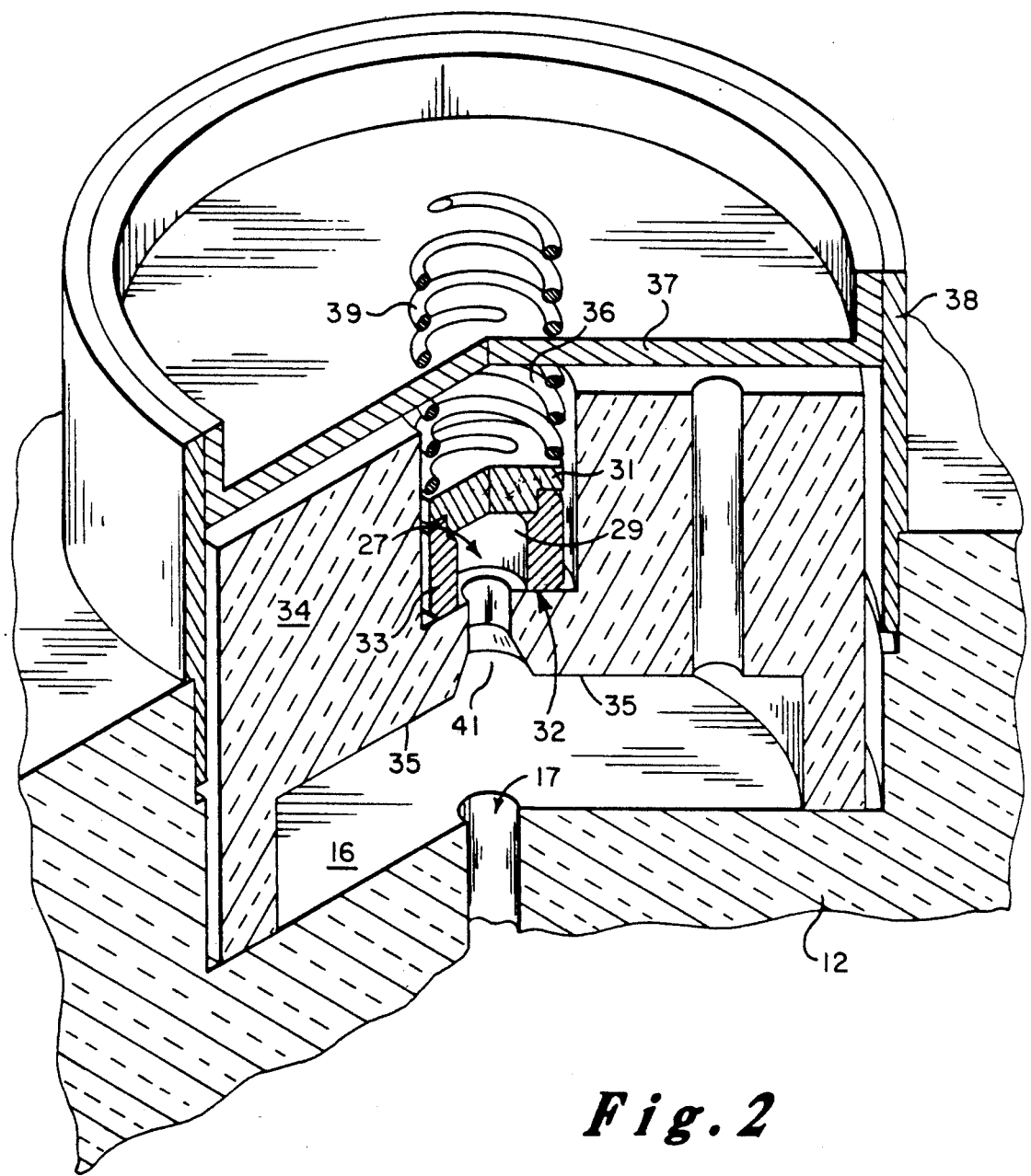
FIG. 2 is an enlarged elevational and cross-sectional view of the portion of the cathode assembly of FIG. 1 containing the hybrid cathode of the present invention.

Referring now to FIG. 1 and FIG. 2, a partial cross-sectional view of $CO_2$ waveguide laser 10 embodying the hybrid cathode 32 of the present invention is shown. Laser 10 is fabricated from a block of insulating material 12, here alumina ($Al_2O_3$) ceramic. Block 12 constitutes any conventional sealed laser envelope, as will be described. Waveguide 14 is disposed longitudinally through block 12 as shown. Electrode cavities 16, 18, 20 are also disposed in envelope 12 and coupled to waveguide 14 by passages 17, 19, 21 as shown. Mirrors 22, 24 are secured and sealed by conventional means, such as an indium seal, to block 12 at opposite ends of waveguide 14 to form an optical resonator therebetween. Here, mirror 22 is fully reflecting while mirror 24 is partially transmissive and serves as the output coupler of the laser beam produced by laser 10 in a manner to be described. Laser 10 further comprises cathode assemblies 26, 28 and anode assembly 30. Each cathode assembly 26, 28 comprises hybrid cathode 32 of the present invention. Hybrid cathode 32 is shown in detail in FIG. 2 and will be described in detail hereinafter. Hybrid cathode 32 is mounted in sputter shield 34. Sputter shield 34 is fabricated from an insulating material, which here is MACOR TM, a machinable, glass ceramic manufactured by Corning Glass Works of Corning, N.Y. 14830. Hybrid cathode 32 is held in place within sputter shield 34 by spring 36, here a gold-plated, stainless steel spring. Spring 36 is highly compressed between hybrid cathode 32 and the underside of metal plate 37 to hold hybrid cathode 32 in place and to make electrical contact between hybrid cathode 32 and metal plate 37. Metal plate 37 here is fabricated from nickel and is welded within ring 38 as shown in FIG. 2. Ring 38 is here fabricated from Kovar TM or Invar TM, which are conventional alloys of steel. Ring 38 is brazed in a conventional manner to insulating block 12 around the circumference of electrode cavity 16. Thus, ring 38 and metal plate 37 completely enclose and seal electrode cavity 16. A second gold-plated, stainless steel spring 39 is soldered at a first end thereof to metal cap 40 as shown in FIG. 1. When cathode assembly 26 is fully assembled as described below, spring 39 is highly compressed between metal cap 40 and metal plate 37 to provide electrical contact therebetween. Metal cap 40, here made from brass or copper, is disposed as shown within insulating cover 50, which is here fabricated from MACOR TM. Metal cap 40 includes a conventional electrical socket 42 extending therefrom into a passage in cover 50, as shown. Socket 42 is soldered into metal cap 40 and is adapted to receive conventional plug 44 on a first end of conductive interconnect 46, which is here a wire. A second end of conductive interconnect 46 is coupled to conventional discharge control 48 as shown. Cover 50 completely encloses metal plate 37 and ring 38 (and thus hybrid cathode 32 and sputter shield 34) and is epoxied to block 12 to provide an electrically insulating shield for cathode assembly 26. Cathode assembly 28 is constructed identically to cathode assembly 26 and is coupled to discharge control 48 by conductive interconnect 46', as shown.

Anode assembly 30 comprises conventional anode 52, here fabricated from platinum (Pt) or an alloy of platinum and rhodium (Rh) such as commercially available $Pt_{0.9}Rh_{0.1}$. Anode 52 is conventionally spot-welded at a first end thereof to the underside of metal plate 54 and extends as shown into electrode cavity 18. Metal plate 54 here is fabricated from nickel. Metal plate 54 is welded within ring 53 which is here fabricated from Kovar TM or Invar TM. Ring 53 is brazed in a conventional manner to insulating block 12 around the circumference of the electrode cavity 18. Thus, ring 53 and metal plate 54 completely enclose and seal electrode cavity 18. Spring 56, here a gold-plated, stainless steel spring, is soldered at a first end thereof to metal cap 58. When anode assembly 30 is fully assembled as described below, spring 56 is highly compressed between metal cap 58 and the top side of metal plate 54 to provide electrical contact therebetween. Metal cap 58 is here made from brass or copper and is disposed within insulating cover 66, which is here fabricated from MACOR TM. Metal cap 58 includes a conventional electrical socket 60 extending therefrom into a passage in cover 66, as shown. Socket 60 is soldered within metal cap 58 and is adapted to receive conventional plug 62 on a first end of conductive interconnect 64, which is here a wire. A second end of conductive interconnect 64 is coupled to conventional discharge control 48. Cover 66 is epoxied to block 12 and completely encloses metal plate 54 and ring 53 (and thus anode 52) to provide an electrically insulating shield for anode assembly 30.

Waveguide laser 10 is filled with a low-pressure, gaseous gain medium, here a mixture of carbon dioxide ($CO_2$), carbon monoxide (CO), helium (He) and Xenon (Xe). Typically, the gain medium is maintained at a pressure of 70 Torr. In the preferred embodiment, waveguide laser 10 is a sealed device, that is, all openings (such as those of waveguide 14 and electrode cavities 16, 18, 20) are sealed in the manner described above. Thus, the gaseous gain medium is continuously maintained within envelope 12. A conventional gas reservoir (not shown) disposed within envelope 12 and coupled to waveguide 14 is filled with a reserve supply of the gaseous gain medium. As is known, an electrical discharge between anode 52 and each hybrid cathode 32 (which is described in detail hereinafter) causes a turbulence in the gas disposed in waveguide 14, which results in a gradual exchange by convection of the gas disposed in waveguide 14 and the gas disposed in the reservoir. To put it another way, such electrical discharge causes the gas within waveguide 14 to flow into the reservoir and be replaced within waveguide 14 by gas from the reservoir.

In operation, discharge control 48 applies a high DC voltage potential between anode 52 and each hybrid cathode 32 via conductive interconnects 64, 46 and 46'. The precise potential difference to be applied by discharge control 48 between anode 52 and each hybrid cathode 32 depends on several factors including the distance between such electrodes and the precise composition of the gaseous gain medium. Typically, such potential difference will be approximately 7.5 kVDC. Such high potential difference generates an electric discharge current between anode 52 and each hybrid cathode 32, such electric discharge current flowing through the gaseous gain medium disposed in waveguide 14. As is known, the $CO_2$ is the active portion of the gain medium. Thus, energy level transitions are produced in the $CO_2$ of the gain medium as a result of the electrical current flowing therethrough, such energy level transitions emitting optical energy which resonates between mirrors 22, 24 and forms a laser beam. As is known, an electrical discharge current flowing through $CO_2$ dissociates a portion of the $CO_2$ into components thereof, most notably carbon monoxide (CO) and oxygen ($O_2$). Referring also to FIG. 2, in the present invention each hybrid cathode 32 comprises first portion 31 and second portion 33. Second portion 33 has a passage 27 disposed therethrough. First portion 31 is mounted on second portion 33 at a first end of passage 27 and is thus supported by second portion 33. Passage 27 is open at a second end thereof for reasons to be described. First portion 31 is fabricated from catalyst material to aid in the recombination of the dissociated components (e.g. CO and $O_2$) of the $CO_2$. Here, such catalyst material comprises platinum (Pt). First portion 31 may alternately comprise an alloy of platinum and a small amount of rhodium (Rh); such an alloy of platinum is $Pt_{0.9}Rh_{0.1}$ and is commercially available. Second portion 33 comprises copper (Cu), here oxygen-free high conductivity (OFHC) copper. Spring 36, compressed by metal plate 37, is in electrical contact with first portion 31 of hybrid cathode 32. As stated previously, hybrid cathode 32 is securely held within sputter shield 34 by compressed spring 36. The discharge current flows from each hybrid cathode 32 to anode 52 through the gain medium disposed in waveguide 14. Manifestly, this is a high impedance current path. Thus, the discharge current is fairly small (e.g. on the order of a few milliamperes). For reasons to be discussed hereinafter, the electrical discharge at each hybrid cathode 32 occurs substantially only from platinum first portion 31 thereof. The discharge current passes through passage 27 of copper second portion 33, out the open, second end of passage 27, and through slot 41 in the bottom of sputter shield 34, flowing to anode 52 via passage 17, waveguide 14 and passage 19. The discharge current flows in a similar manner to anode 52 from the hybrid cathode within cathode assembly 28. That is, such current flows to anode 52 via passage 21, waveguide 14 and passage 19, As is known, platinum is a good catalyst in the chemical reaction recombining dissociated components of $CO_2$. A platinum or platinum-alloy cathode also sputters or emits metallic particulates of platinum during electrical discharge. A little thought reveals that such sputtering is due to bombardment of the cathode by positive ions during the electrical discharge, causing the emission of electrons from the platinum cathode toward the anode. From observing this sputtering, Applicants believe that it is the sputtering of metal catalyst particulates from a platinum cathode that provides the catalysis for the recombination of CO and $O_2$ dissociated by the electrical discharge. Alternately stated, Applicants believe that the reason that a platinum anode provides little or no catalysis is that the anode does not sputter. If the sputtered platinum particulates are deposited on regions of the envelope near the platinum cathode, the electrical discharge may at times effectively occur from a random one or ones of the platinum particulate deposits, rather than from the surface of the cathode itself. To put it another way, the electrical discharge may randomly jump from the surface of the cathode to a platinum particulate sputter deposit and occur between the platinum deposit and the anode, rather than directly between the cathode and anode. Over time, as additional sputtered platinum particulates are deposited near the cathode, the electrical discharge will be given a progressively larger surface over which to occur. Thus, the electrical discharge may effectively migrate randomly about in the area of the cathode from one sputter deposit location to another during electrical discharge. Applicants have discovered that such discharge migration causes poor discharge current stability and random frequency jitter or FM noise in the produced laser beam. Additionally, some sputtered particulates may fall into the laser waveguide and eventually adhere to mirror surfaces, further degrading laser performance.

The present invention utilizes copper second portion 33 of hybrid cathode 32 to prevent discharge migration, constrain the discharge to occur substantially directly between hybrid cathode 32 and anode 52, and impede the movement of sputtered particulates into laser waveguide 14. During electrical discharge, an oxide layer forms on surface 29 of copper second portion 33. The oxide layer formed on copper surface 29 is found to be quite thin and does not become thicker, due to a lack of free oxygen near surface 29. Such lack of oxygen can be attributed to the proximity of the catalytic platinum first portion 31 to surface 29. Recombination of dissociated CO and $O_2$ occurs most strongly in the area near the platinum catalyst 31. Thus, there is little free $O_2$ available near surface 29 to oxidize surface 29 and the resulting oxide layer thereon is constrained to be quite thin and hence does not flake off of surface 29 and form particles which can disperse throughout resonant cavity 14. The thin oxide layer on copper surface 29 is a semiconductor, which makes the electrical resistance of copper surface 29 higher than that of platinum first portion 31. Thus, the electrical discharge from cathode 32, which will follow the path of least resistance, is restricted to occur substantially only from platinum first portion 31 and is prevented from occurring from copper surface 29, and hence from copper second portion 33. To put it another way, copper second portion 33 prevents discharge migration away from platinum first portion 31 and onto copper second portion 33. It is noted that since the current of the electrical discharge dictates the area of the electrical discharge occurring at hybrid cathode 32, discharge control 48 may be adjusted to provide a discharge current having a sufficient magnitude to cause the electrical discharge to emit from the entire area of platinum first portion 31. Discharge control 48 may be further adjusted to provide a discharge current having sufficient magnitude to cause the electrical discharge to emit from the entire area of first portion 31 and from a small portion of copper wall 29 around the periphery thereof and immediately adjacent to platinum first portion 31, provided that this adjustment is made before the aforementioned copper oxide layer forms on such peripheral portion of wall 29. Either adjustment would greatly impede the point of electrical discharge from migrating at all, even along first portion 31, resulting in a very stable electrical discharge and little or no frequency jitter or FM noise in the produced laser beam.

Even with the use of copper second portion 33, platinum first portion 31 still sputters platinum particulates during electrical discharge. However, it is found that the level of the sputtering is decreased from that which would occur from a platinum or platinum-alloy cathode not employing a copper second portion. It is possible that the presence of copper second portion 33 and the proximity thereof to platinum first portion 31 affects the platinum to cause the reduced sputtering. The semiconductor oxide layer formed on the surface 29 of copper second portion 33 prevents the sputtered platinum particulates from being deposited on the surface 29 of second portion 33. However, such particulates are not emitted into laser waveguide 14. Rather, possibly due to the presence of the copper and the proximity thereof to platinum first portion 31, the platinum particulates are found to be collected on the lower surface 35 of MACOR TM sputter shield 34. Second portion 33 provides sufficient spacing between first portion 31 and the surface 35 on which the sputtered platinum particulates are collected to prevent the electrical discharge from jumping from first portion 31 to the particulates collected on surface 35. In other words, surface 35 is sufficiently spaced from first portion 31 to constrain the electrical discharge to occur substantially directly between first portion 31 of cathode 32 and anode 52, rather than via the sputtered platinum particulates. The aforementioned $Pt_{0.9}Rh_{0.1}$ platinum alloy is preferred over pure platinum as the material for first portion 31, since the rhodium may cause improved adhesion of the sputtered platinum particulates to surface 35 of sputter shield 34.

From the foregoing it is seen that the hybrid cathode 32 of the present invention solves several long-felt problems with sealed $CO_2$ lasers. By comprising platinum first portion 31, hybrid cathode 32 provides a catalyst to aid in the recombination of the constituent components (e.g. CO and $O_2$) of $CO_2$ which are dissociated by the electrical discharge in laser 10. The use of copper second portion 33 to support platinum first portion 31 constrains the electrical discharge to occur substantially directly between platinum first portion 31 of cathode 32 and anode 52 by providing sufficient spacing between first portion 31 and a surface 35 on which sputtered platinum particulates are found to become deposited. That is, copper second portion 33 prevents the electrical discharge from jumping or migrating to the collected, sputtered platinum particulates. Further, the collection of the sputtered platinum particulates on surface 35, possibly due to the presence of the copper comprising second portion 33 and the proximity of such copper to platinum first portion 31, inhibits such particulates from entering laser waveguide 14 and adhering to and damaging mirrors 22, 24.

Anode 52 here comprises pure platinum or $Pt_{0.9}Rh_{0.1}$ and, as shown in FIG. 1, extends downward into cavity 18 without a sputter shield or a copper portion. Neither need be used with a platinum anode since, as discussed above, an anode gathers electrons from hybrid cathodes 32 during electrical discharge and thus does not sputter or eject platinum. Thus no platinum particulates are emitted to fall into laser waveguide 14 or to adhere to surfaces of cavity 18 and cause discharge migration. Consequently, of course, and as is known, platinum anode 52 provides little or no catalysis to aid in the recombination of dissociated components of the $CO_2$ gain medium.

Having described a preferred embodiment of the present invention, certain modifications to the invention may become apparent to those skilled in the art. For example, hybrid cathode 32 may comprise other configurations than that described. Also, other methods of combining platinum and copper within a hybrid structure, such as sintering, may be possible. Additionally, the concepts of the present invention may be applied to other than platinum catalytic material and other than copper as the material to prevent discharge migration and constrain the discharge to occur substantially directly between a pair of electrodes. Accordingly, it is understood that the scope of the present invention is to be limited only by the scope of the appended claims.

What is claimed is:

1. In combination:
    an optical resonant cavity;
    a gain medium disposed within the optical resonant cavity, said gain medium comprising a compound subject to dissociation into components thereof;
    means for generating an electrical discharge in the gain medium, said electrical discharge dissociating a portion of the compound into the components thereof;
    wherein said electrical discharge generating means comprises a plurality of electrodes. a first one of the plurality of electrodes comprising a first portion comprising means for recombining the dissociated components, said first portion emitting particulates thereof during said electrical discharge;
    surface means for collecting said emitted particulates; and
    means for spacing said first portion of the first one of the plurality of electrodes sufficiently from the surface means to substantially prevent the electrical discharge from jumping from the first one of the plurality of electrodes to the particulates collected on said surface means.

2. The combination of claim 1 wherein the first one of the plurality of electrodes is a cathode.

3. The combination of claim 2 wherein said first portion of the first one of the plurality of electrodes comprises platinum.

4. The combination of claim 1 wherein said spacing means comprises a second portion of the first one of the plurality of electrodes, said second portion being disposed between the first portion of the first one of the plurality of electrodes and the surface means.

5. The combination of claim 4 wherein said second portion of the first one of the plurality of electrodes comprises copper, with the electrical discharge from the first one of the plurality of electrodes occurring substantially only from the first portion thereof.

6. The combination of claim 5 wherein a passage is disposed through said copper second portion of the first one of the plurality of electrodes, the first portion of the first one of the plurality of electrodes being mounted on the copper second portion at a first end of said passage with the electrical discharge from the first one of the plurality of electrodes passing through said passage.

7. The combination of claim 6 wherein said electrical discharge generating means further comprises means for adjusting the electrical discharge to occur from the entire first portion of the first one of the plurality of electrodes.

8. The combination of claim 6 wherein said electrical discharge generating means further comprises means for adjusting the electrical discharge to occur from the entire first portion and from a peripheral portion of the second portion immediately adjacent to the first portion.

9. The combination of claim 1 wherein said gain medium comprises carbon dioxide.

10. A method of operating a laser comprising the steps of:
generating an electrical discharge between a cathode and an anode through a gain medium, such electrical discharge dissociating a compound of the gain medium into components thereof;
recombining the dissociated components of said compound;
sputtering particulates from the cathode; and
collecting said sputtered particulates on a surface sufficiently spaced from the cathode to constrain the electrical discharge to occur substantially directly between the cathode and the anode.

11. A laser comprising:
(a) an optical resonant cavity having a gain medium comprising a plurality of components disposed therein;
(b) an anode coupled to the optical resonant cavity;
(c) a cathode coupled to the optical resonant cavity;
(d) means for producing an electrical discharge between the cathode and the anode through a portion of the gain medium, the electrical discharge dissociating a portion of the gain medium into the plurality of components,
said cathode comprising catalyst means, portions of said catalyst means being emitted by the cathode, for aiding recombination of the dissociated plurality of components; and
(e) means for collecting the emitted catalyst means on a surface spaced from the cathode constraining the electrical discharge to occur substantially directly between the cathode and the anode.

12. The laser of claim 11 wherein said catalyst means comprises platinum.

13. The laser of claim 11 wherein said catalyst means comprises an alloy of platinum and rhodium.

14. The laser of claim 11 wherein said collecting means comprises a second portion of said cathode. the second portion of the cathode being disposed between the catalyst means of the cathode and the surface.

15. The laser of claim 14 wherein said second portion of the cathode comprises means for restricting the electrical discharge from the cathode to occur substantially only from the catalyst means of the cathode.

16. The laser of claim 15 wherein said catalyst

17. In combination:
(a) a laser envelope;
(b) an anode disposed in the laser envelope;
(c) a cathode disposed in the laser envelope, said cathode comprising a platinum first portion;
(d) means for generating an electrical discharge between the cathode and the anode, said cathode emitting platinum particulates therefrom during the electrical discharge; and
(e) means for reducing the level of the platinum particulate emissions, said reducing means comprising a copper second portion of the cathode disposed adjacent to the first portion thereof.

* * * * *